US010393086B2

(12) United States Patent
Koenen et al.

(10) Patent No.: US 10,393,086 B2
(45) Date of Patent: Aug. 27, 2019

(54) IGNITION COIL BOOST AT LOW RPM

(71) Applicant: Briggs & Stratton Corporation, Wauwatosa, WI (US)

(72) Inventors: Robert John Koenen, Pewaukee, WI (US); Jason A. Hansen, Elkhorn, WI (US); Andrew Paskov, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 0 days.

(21) Appl. No.: 15/936,647

(22) Filed: Mar. 27, 2018

(65) Prior Publication Data

US 2018/0283345 A1 Oct. 4, 2018

Related U.S. Application Data

(60) Provisional application No. 62/480,700, filed on Apr. 3, 2017.

(51) Int. Cl.
| | |
|---|---|
| *F02P 5/12* | (2006.01) |
| *F02P 15/12* | (2006.01) |
| *F02P 3/02* | (2006.01) |
| *F02P 9/00* | (2006.01) |
| *F02P 3/04* | (2006.01) |
| *F02P 5/155* | (2006.01) |
| *F02P 7/067* | (2006.01) |

(52) U.S. Cl.
CPC ............... *F02P 15/12* (2013.01); *F02P 3/02* (2013.01); *F02P 3/0407* (2013.01); *F02P 5/1558* (2013.01); *F02P 7/067* (2013.01); *F02P 9/00* (2013.01); *F02P 7/0675* (2013.01)

(58) Field of Classification Search
CPC .. F02P 15/12; F02P 3/02; F02P 3/0407; F02P 5/1558; F02P 7/067; F02P 9/00; F02P 7/0675
See application file for complete search history.

(56) References Cited

U.S. PATENT DOCUMENTS

| 1,773,920 A | 8/1930 | Mayforth |
| 2,075,431 A | 3/1937 | Du Laney |

(Continued)

FOREIGN PATENT DOCUMENTS

GB 1229930 A * 4/1971 ............... F02P 3/01

*Primary Examiner* — Hieu T Vo
(74) *Attorney, Agent, or Firm* — Andrus Intellectual Property Law, LLP

(57) ABSTRACT

A system and method for enhancing spark generation in an ignition coil of an internal combustion engine at low rotational speeds of the flywheel. The method and system monitor the rotational speed of the flywheel and, when the rotational speed of the flywheel is below a threshold rotational speed, the system and method supplies voltage pulses to the primary winding. The timing of the voltage pulses supplied to the primary winding are triggered off of voltage transitions in pulses induced in the primary winding upon rotation of the flywheel. Once the internal combustion engine has started, the switching device transitions into a second condition to disconnect the electrical storage device from the primary winding. The spark generation system of the present disclosure allows for starting of an internal combustion engine upon slower rope pull starting or upon discharge of a starter battery.

18 Claims, 5 Drawing Sheets

(56) References Cited

U.S. PATENT DOCUMENTS

| | | | |
|---|---|---|---|
| 2,529,921 A | | 11/1950 | Davolt |
| 2,843,758 A | | 7/1958 | Bement |
| 2,888,574 A | | 5/1959 | Buon |
| 2,930,900 A | | 3/1960 | Bement |
| 3,452,731 A | | 7/1969 | Becker |
| 3,620,200 A | | 11/1971 | Stephens et al. |
| 4,016,849 A | | 4/1977 | Pan Lei |
| 4,562,823 A | | 1/1986 | Moritugu et al. |
| 4,829,972 A | * | 5/1989 | Montano ............... F02P 1/086 123/599 |
| 5,975,058 A | | 11/1999 | French et al. |
| 6,308,688 B1 | | 10/2001 | French et al. |

* cited by examiner

Primary Signal RPM > 250

Primary Signal RPM < 250

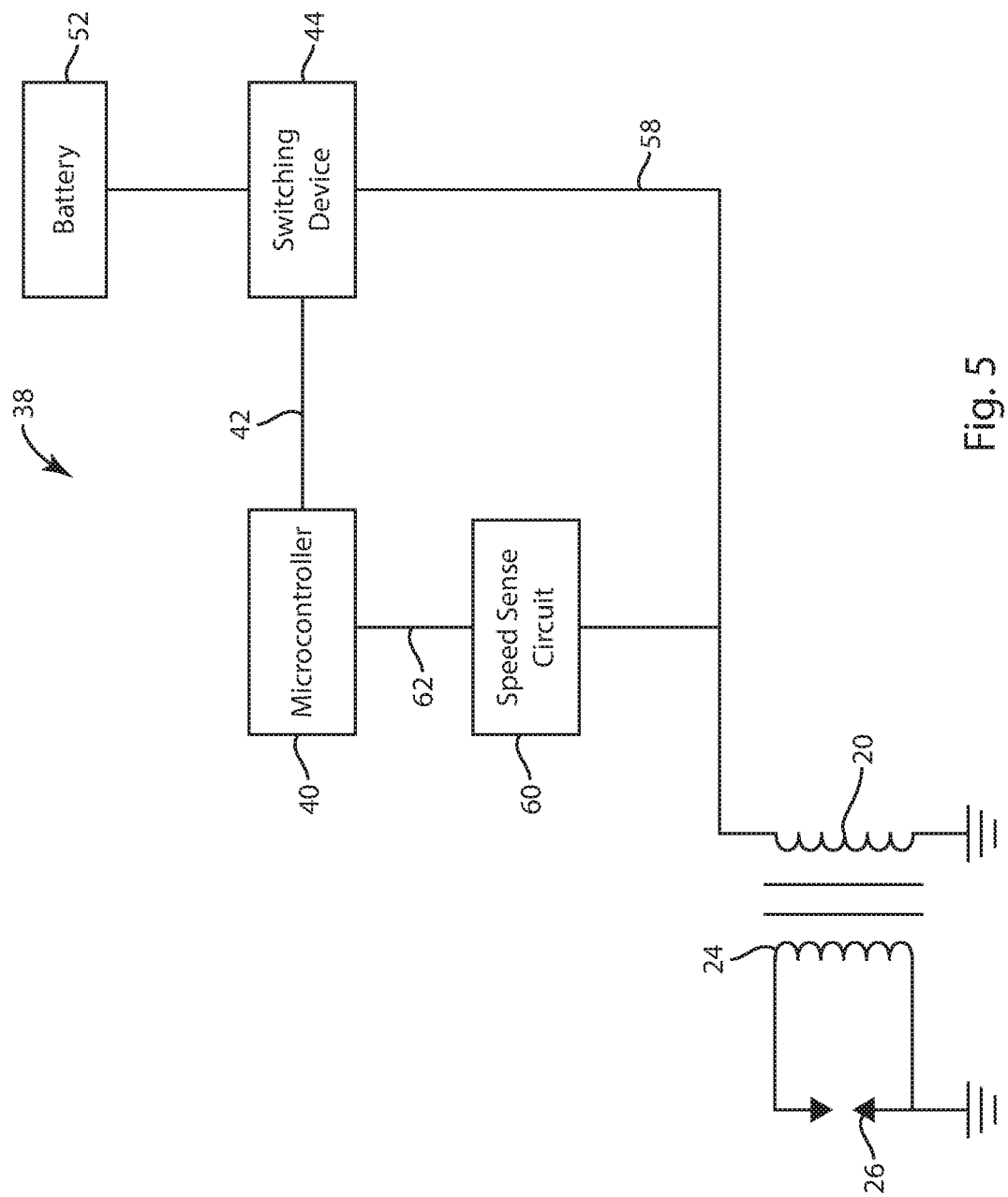

IGNITION COIL BOOST AT LOW RPM

CROSS REFERENCE TO RELATED APPLICATION

The present application is based on and claims priority to U.S. Provisional Patent Application Ser. No. 62/480,700, filed on Apr. 3, 2017, the disclosure of which is incorporated herein by reference.

BACKGROUND

The present disclosure generally relates to an ignition circuit for use with an internal combustion engine. More specifically, the present disclosure relates to an ignition coil boosting circuit that uses stored electrical power to generate sparks at low RPMs of the internal combustion engine.

Presently, starting circuits exist for internal combustion engines that utilize a battery to operate a starter motor. During operation, the starter motor rotates a flywheel of the internal combustion engine at a speed sufficient to induce an amount of current applied to the primary coil, which is abruptly terminated upon further rotation, resulting in a voltage spike that is able to jump the spark plug gap to generate a spark within the engine. After the engine starts, the rotation of the flywheel controls the generation of sparks within the engine such that the internal combustion engine can continue to operate without battery power. Although such starting circuit has proven effective, the starter motor must rotate the engine at a speed sufficient to induce the required amount of current to create a spark. When the battery power supply becomes depleted or when the ambient temperature drops, the charge of the battery may not be able to rotate the starter motor and flywheel at a speed sufficient to generate enough current to create a spark.

In other starting circuits that do not include a battery to operate the starter motor, a rope pull recoil starter is used to rotate the flywheel to induce the required current needed to start the engine. Rope pull recoil starters require the operator to exert a physical force on the rope pull to rotate the engine at a speed sufficient to create the current needed to start the engine. Although these rope pull systems are inexpensive, such systems are disfavored by the elderly and those with physical limitations.

SUMMARY

The present disclosure generally relates to a system and method for enhancing spark generation in the ignition coil of an internal combustion engine. The enhanced spark generation system and method of the present disclosure allows for the proper spark to be generated when the starting process for the internal combustion engine is unable to rotate the internal combustion engine above a threshold speed needed for the magnets on the rotating flywheel of the internal combustion engine to generate a spark.

The system of the present disclosure is particularly desirable for use with an internal combustion engine that includes a rope pull starting system or that includes a starter battery that is unable to rotate a starter motor at a speed needed to initiate starting of the internal combustion engine. The charge on the starter battery may be insufficient to rotate the starter motor due to a depleted stored charge, an intentionally reduced size of the storage battery or as a result of cold weather operating conditions. The spark generating system of the present disclosure creates a voltage boost at the primary winding to enhance and optimize the spark of the internal combustion engine.

In one contemplated embodiment, the system for enhancing spark generation in accordance with the present disclosure includes a controller that is in communication with the primary winding of the internal combustion engine. The controller, either directly or through a speed sensing circuit, is able to determine the rotational speed of the flywheel during the initial starting procedure for the internal combustion engine. In an internal combustion engine that includes a rope pull, the starting procedure includes the initial rope pull which causes the flywheel to rotate past the primary winding, which creates a voltage pulse.

The system includes an electric storage device that is designed to store an electrical charge. When the controller senses the beginning of the starting procedure and senses that the flywheel is rotating at a speed lower than a threshold rotational speed, the controller operates a switching device to move the switching device into a first condition. When the switching device is in the first condition, the electrical storage battery is allowed to discharge through the primary winding of the internal combustion engine. The discharge of the electrical storage device through the primary winding creates a voltage pulse across the primary winding, which in turn induces the flow of current in the secondary winding of the internal combustion engine. Since the secondary winding of the internal combustion engine is connected to the spark circuit for the internal combustion engine, the voltage pulse across the primary winding creates an enhanced spark as compared to a spark created without the additional voltage pulse from the electrical storage device. In this manner, the electrical storage device is able to aid in starting the internal combustion engine when the flywheel of the internal combustion engine is rotating at a speed below the threshold rotational speed.

In another alternate embodiment, the controller of the enhanced spark generation system can be replaced by an analog timing circuit. The timing circuit again determines whether the rotational speed of the flywheel of the internal combustion engine is below a threshold rotational speed. If the rotational speed is below the threshold value, the system moves the switching device to the first condition such that the electrical storage device is able to discharge a voltage pulse to the primary winding of the internal combustion engine. The voltage pulse has a predetermined duration and the voltage pulse is provided at a time that is optimized to be as close as possible to top dead center. In an embodiment in which the initial portion of the voltage pulse is sensed, the system includes a timing delay to delay the voltage pulse from the battery from the sensing of the voltage transition in the voltage pulse induced in the primary winding. In this manner, the system is able to create the spark in the internal combustion engine at or near top dead center for the piston movement within the internal combustion engine. Once the rotational speed of the internal combustion engine exceeds the threshold rotational speed, the switching device transitions to a second condition in which the electrical storage device is no longer connected to the primary winding to prevent any further discharge.

BRIEF DESCRIPTION OF THE DRAWINGS

The drawings illustrate the best mode presently contemplated of carrying out the disclosure. In the drawings:

FIG. 5 is a circuit schematic of a first embodiment to provide an ignition coil boost to a starter motor;

DETAILED DESCRIPTION

Figure 1:
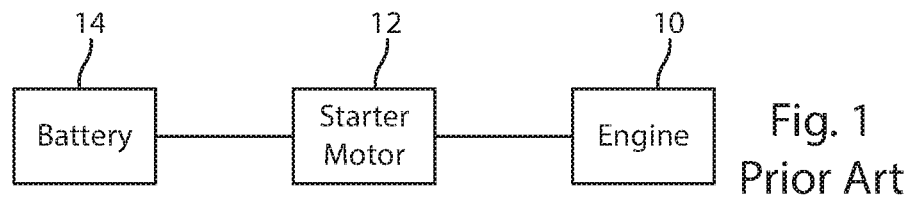
FIG. 1 is a schematic illustration of a prior art starting circuit.

Referring first to FIG. 1, thereshown is a conventional starting circuit used to operate an internal combustion engine 10. The starting circuit includes a starter motor 12 that is driven by a battery power supply 14. The battery power supply 14 can be one of many different types of battery power supplies, such as a 12 Volt lead-acid battery or a bank of lithium-ion batteries. The connection between the battery 14 and the starter motor 12 is controlled by some type of ignition circuit, which may be a keyed ignition, a push-to-start circuit or any other type of switching mechanism that connects the battery power supply 14 to the starter motor.

Figure 2:
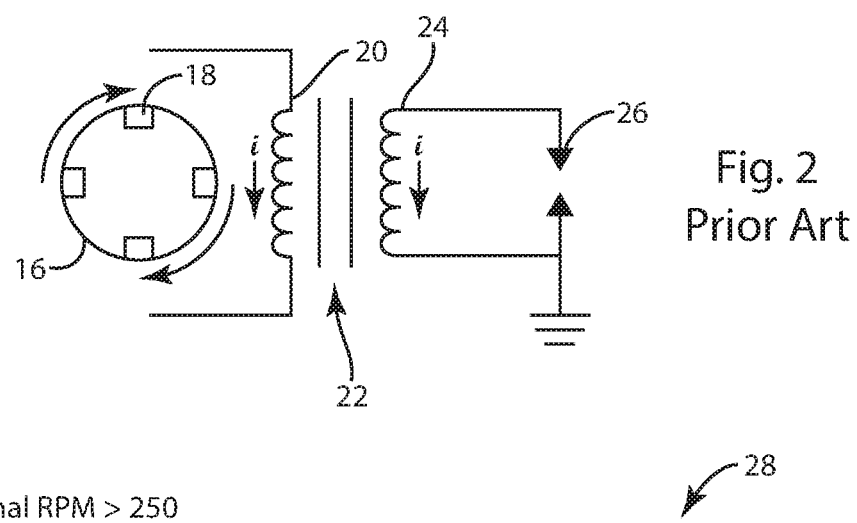
FIG. 2 is a schematic illustration of the primary and secondary winding used to generate a spark.

Referring now to FIG. 2, upon operation of the starter motor, the starter motor rotates the flywheel 16, which causes the permanent magnets 18 to rotate past the primary winding 20 of the transformer 22. The rotation of the magnets 18 past the primary winding 20 induces a current in the primary winding 20, which is in turn reflected to the secondary winding 24. The current flowing through the secondary winding 24 continues to flow until the magnet 18 moves away from the primary winding 20. This sudden interruption in the flow of current generates a voltage spike on the primary coil that multiplies across to the secondary coil, resulting in the voltage being sufficient to jump across the spark plug gap, which creates a spark across at the spark plug 26. The spark plug 26 ignites fuel contained within a cylinder of the internal combustion engine, which results in operation of the internal combustion engine. Once the engine begins to operate, the battery 14 is disconnected from the starter motor 12 and the engine 10 continues to run. Such a circuit is well known and used to operate a large number of internal combustion engines.

Figure 3:
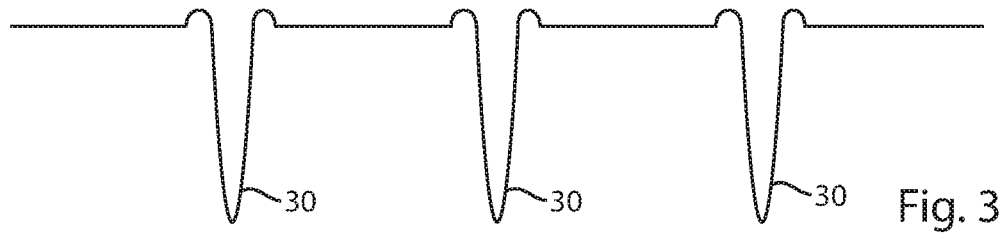
FIG. 3 is a voltage trace of the primary winding when the engine is rotating at greater than 250 RPMs.

When the flywheel is rotating at a high speed, such as greater than 250 RPMs, the rotating magnets create a voltage trace 28, such as shown in FIG. 3. The voltage trace 28 includes a series of negative induced pulses 30, each of which correspond to the rotation of the magnet past the primary winding. In the embodiment shown in FIG. 3, the magnitude of the induced pulses 30 is sufficient to create a spark across the spark plug 26. In the embodiment of FIG. 3, the magnets on the rotating flywheel are configured to create the series of negative induced pulses 30 during rotation of the flywheel. However, if the orientation of the magnets on the flywheel were reversed, the signal of FIG. 3 would change from a positive-negative-positive pulse to a negative-positive-negative pulse. The description and circuit diagrams in the present disclosure would then simply be reconfigured to accommodate the modified triggering signals in order to identify and act on the triggering signal at or near the top dead center of the piston movement and timing.

However, if the battery 14 becomes depleted either through use or cold temperatures, the battery 14 will rotate the magnets of the flywheel past the primary winding at a much lower speed. This lower speed includes a lower current in the primary winding 20 and results in the voltage trace 32 shown in FIG. 4. The voltage trace 32 includes similar voltage peaks 34. However, the voltage peaks 34 are significantly smaller in magnitude and are thus not sufficient to create a spark across the spark plug 26.

FIG. 5 illustrates an ignition coil boosting circuit 38 in accordance with a first embodiment of the present disclosure. The boosting circuit 38 is designed to be used in a starting system that includes a starter motor powered by a battery power supply. However, the circuit 38 could also be used with a rope pull recoil starter. In the embodiment shown in FIG. 5, a controller 40 is used to control the timing of supplemental voltage pulses across the primary winding 20. The voltage pulses create current flow through the primary winding, which is abruptly terminated to create a voltage spike, which translates to an even higher voltage spike on the secondary winding. The high voltage spike on the secondary winding 24 is able to jump the spark plug gap to create a spark utilizing the spark plug 26. The controller 40 includes an output 42 that is supplied to a switching device 44 to control the condition/position of the switching device between first and second conditions. The switching device 44 could be one of many different types of devices that can transition between first and second conditions at a speed sufficient to generate a voltage pulse. As an illustrative example, the switching device 44 could be a MOSFET, triac or any other type of device that can transition between first and second conditions upon receiving an activation signal along line 42 from the controller 40. In the embodiment shown, the output signal generated by the controller 40 at the output 42 includes a series of square wave voltage pulses 50, such as shown in FIGS. 6A and 6B as combined with the induced voltage pulses from the rotating flywheel.

Figure 6A:
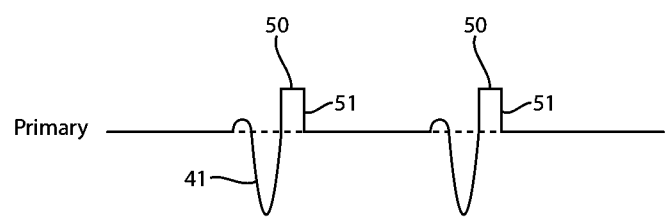
FIG. 6A is a timing diagram showing the timing of pulses from the circuit shown in FIG. 5 and triggering on the primary going negative.

As illustrated in FIG. 6A, a first scheme for generating the square wave supplemental voltage pulses is shown. In the embodiment of FIG. 6A, the negative going portion of the weak induced pulse, which is shown by reference numeral 41, is sensed and the generation of the square wave voltage pulse 50 is triggered off of the induced voltage pulse at the primary winding going negative. The square wave 50 is delayed slightly so that it is generated at or near top dead center. The square wave 50 includes a falling edge 51. The falling edge 51 causes the spark plug to activate.

Figure 6B:
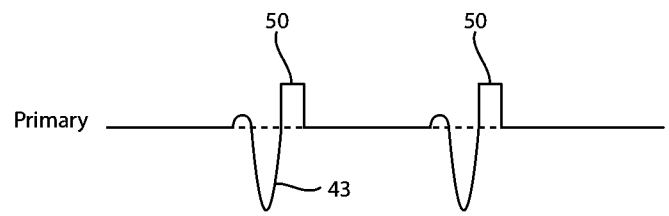
FIG. 6B is a timing diagram showing the timing of pulses from the circuit shown in FIG. 5 and triggering on the primary rising from negative to positive.

FIG. 6B illustrates a second embodiment in which the square wave pulses 50 are triggered off the induced pulse at the primary winding rising from negative to positive, which is shown by portion 43 in FIG. 6B. Although triggering off of the rise from negative to positive requires additional computation, it is more accurate and consistent as compared to the negative going trigger in FIG. 6A. The negative going trigger in FIG. 6A occurs slightly before the optimal spark time and thus requires a delay in the operating circuitry. In the embodiment of FIG. 6B, triggering off of the point where the negative induced pulse in the primary winding transitions to positive is slightly more accurate since this transition point is closer to the top dead center point where it is desirable to fire the spark plug.

Referring back to FIG. 5, when the controller 40 sends a signal to the switching device 44, the switching device 44 turns on, which allows stronger current flow from the stored energy device, such as battery 52, to flow through the switching device 44. When the switching device 44 is turned on, the strong current flow is directed through the control line 58 to the primary winding 20 and overrides the weaker primary signal with strong voltage pulses 50, such as shown in FIGS. 6A and 6B. The abrupt termination of the strong current pulse results in the voltage spike at the secondary winding 24 and ultimately to the spark event. The current flows to the primary winding only during the duration of the time when the switching device 44 is in the "on" condition. Thus, the controller 40 controls the timing and duration of current flow through the primary winding 20 based on the generated output pulses present at the output 42. Battery 52 provides the required stored energy to create the current flow through the primary winding 20, thereby creating the spark at the spark plug 26. However, other stored energy devices, such as a capacitor, could be used. The battery 52 is a separate battery from the stored power supply used to operate the starter motor such as battery 14 shown in FIG. 1.

As illustrated in FIG. 5, a speed sensing circuit 60 provides an input to the microcontroller as shown by input line 62. The signal sensed at the input of the speed sensing circuit 60 is the voltage trace 28 or 32 of FIGS. 3 and 4 and is created by the rotating flywheel. The voltage trace is used by the speed sensing circuit 60 to determine the RPM of the engine and is used to determine when an ignition boost is needed. The speed sensing circuit 60 utilizes the signal from the rotating flywheel to create a signal that is present at the input line 62 to the controller 40. If no ignition coil boost is needed, such as when the battery is at full power and the engine is rotating at speeds greater than a rotational speed threshold such as 250 RPM, the controller 40 does not generate the additional current pulses from the battery 52. However, if the battery power supply driving the starter motor or the force applied to a rope pull recoil starter is insufficient to start the internal combustion engine, the controller 40 senses the low rotational speed from the speed sensing circuit 60 that is below the rotational speed threshold and creates the ignition coil boosting voltage pulses 50 from the battery 52 through the switching device 44 and the control line 58.

The battery 52 can either be the battery power supply used to drive the starter motor 12, such as shown in FIG. 1, or the battery 52 could be a separate battery power supply utilized only to create the spark boosting pulses. In one embodiment, the inventors contemplate that the battery 52 could be as small as a pair of watch batteries, since the battery power supply 52 is required only to generate sufficient current to aid in the generation of a spark upon initial starting of the internal combustion engine. Alternatively, the battery 52 could be replaced with any other type of energy storage device, such as a storage capacitor, that is capable of storing power and providing the voltage and current required for a short spark pulse.

Figure 4:
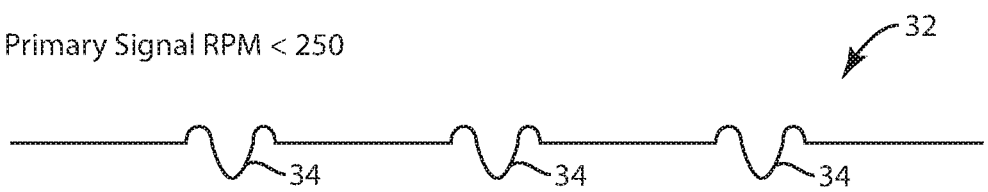
FIG. 4 is a voltage trace similar to FIG. 3 when the engine is rotating at less than 250 RPMs.
Figure 7:
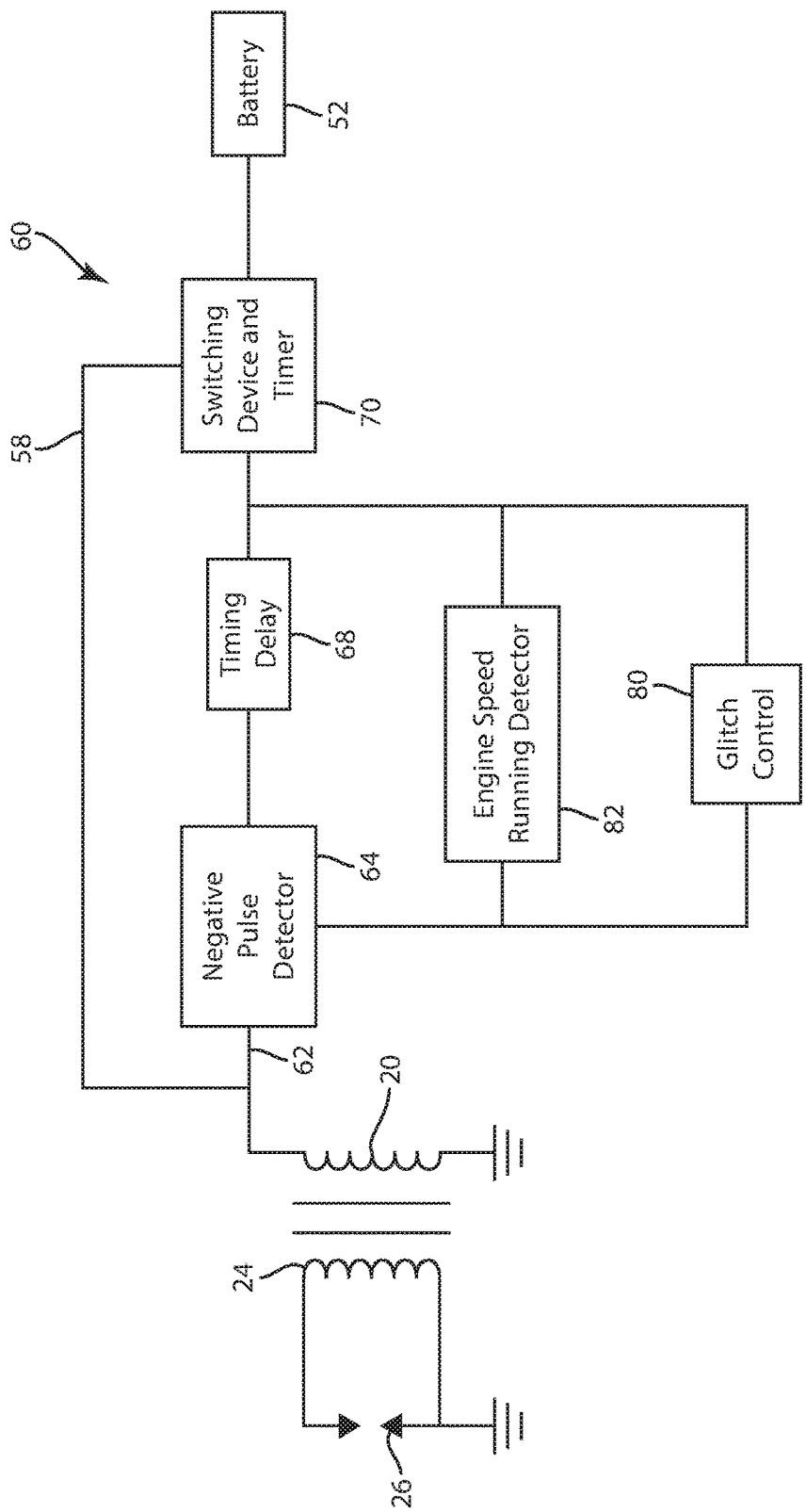
FIG. 7 is a circuit schematic of a second embodiment of an ignition coil boost circuit for an internal combustion engine including a rope pull.

FIG. 7 illustrates a second embodiment of a spark boosting circuit that is used to boost the engine pulse signals created by a rope pull recoil starter and does not require the use of a microcontroller. The spark boosting circuit of FIG. 7 could also be used with a starter motor powered by a battery. The induced pulses created in the primary winding by the rope pull recoil starter have a profile similar to that shown in FIGS. 3 and 4. If the operator is able to pull the rope with sufficient force, the engine will rotate at a speed above the rotational speed threshold of 250 RPMs and the induced pulse profiles will be as shown in FIG. 3. However, if the user is not strong enough to pull the rope with enough force, the pull of the rope causes the engine to rotate at a speed which will be less than the rotational speed threshold of 250 RPM, such as shown in FIG. 4. Although 250 RPM is described in this disclosure as being the rotational speed threshold, other speeds could be used depending upon the size of the engine, configuration of the flywheel and primary winding. During this rotation below the rotational speed threshold, the series of small voltage peaks 34 will be present at line 62.

When the flywheel of the internal combustion engine is rotated, the permanent magnets of the flywheel generate a induced voltage pulses at the primary winding 20, which are in turn present at line 62. The embodiment of FIG. 7 is meant to illustrate one type of circuit design that functions to detect the primary speed and timing of induced pulses present at the primary winding 20 due to the rotation of the permanent magnets of the flywheel during starting. It should be understood that other circuit designs could be utilized and other triggering locations on the induced voltage pulses are contemplated as being within the scope of the present disclosure.

In the embodiment of FIG. 7, a negative pulse detector circuit 64 is configured to sense the negative portion of the induced pulses and provide a signal to the timing delay circuit 68. Since the negative portion of the induced pulse from the primary winding is well before the top dead center position of the piston, the timing delay circuit 68 creates a delay before the voltage pulse from the battery 52 is provided to the primary winding 20.

Once the timing delay created by the timing delay circuit has expired, a signal is provided to the switching device and timer circuit 70. The switching device of the circuit 70 is similar to the switching device 44 as disclosed in FIG. 5. The switching device 70 moves to a first condition such that current from the battery 52 flows along line 58, which is fed to the primary winding 20. The switching device and timer circuit 70 includes an internal timer that controls the duration of time current flows from the battery 52 to the primary winding 20. In one embodiment of the disclosure, the current is supplied to the primary winding for about 1 ms. After this duration of time, the switching device returns to the second, off condition and current stops flowing to the primary winding. This interruption in current flow creates a voltage spike on the primary winding and an even higher voltage spike on the secondary winding 24, which creates the spark across the terminals of the spark plug 26. The primary and secondary windings drive the spark plug 26 in the same manner as described above in the discussion of FIG. 5. The battery 52 shown in FIG. 7 is identical to that shown in FIG. 5 and is thus used to generate sufficient current flow through the primary winding 20 to create spark at the spark plug 26. The circuit shown in FIG. 7 can be either a rope pull assist circuit or can be used with a starter motor. In each case, the circuit allows for a very slow pull of the rope of a recoil starter or slow operation of the starter motor due to a decreased battery power supply. Once the engine flywheel begins rotating, the engine pulses are detected and the circuit 60 supplements the current flow through the primary winding.

As stated above, the circuit schematic shown in FIG. 7 is one of multiple possible implementations. In the circuit 60, glitch control circuit 80 is used to generate a 55 msec delay to hold the circuit off following the initial spark creation. The circuit 80 prevents the ignition noise/ringing from generating further sparks. The closing of the switching device 70 causes the current through the primary winding to stop, which generates the spark through the spark plug 26. The 55 msec delay created by the circuit 80 is a desired delay from the weak spark angle to the desired spark event. For starting, it is desired to delay the spark until closer to top dead center. If the standard start spark angle is approximately 20° before top dead center, it is desirable to delay the spark approximately 20°. The 55 msec delay is selected to be desirable for a rope pull speed of 60 RPM. If the rope were pulled at 120 RPM, the 55 msec delay will fire the spark slightly ahead. Similarly, pulling the rope at 30 RPM will result in the 55 msec delay creating a spark later than desired. The time delay shown in the embodiment of FIG. 7 is specific for the early circuit of FIG. 7. In other embodiments in which triggering is done off of the rising negative portion of the pulse created by the rotating flywheel, the delay will be modified to get the spark timing closer to the top dead center of the piston movement.

The engine speed detector circuit 82 is included to turn off the "boost" spark operation once the engine reaches sufficient speed to generate sparks from the flywheel magnets. The engine speed detector circuit 82 detects the frequency of the induced pulses in the primary winding 20 and prevents the switching device 70 from moving to the first condition when the detect speed of the internal combustion engine is above the rotational speed threshold.

Figure 8:
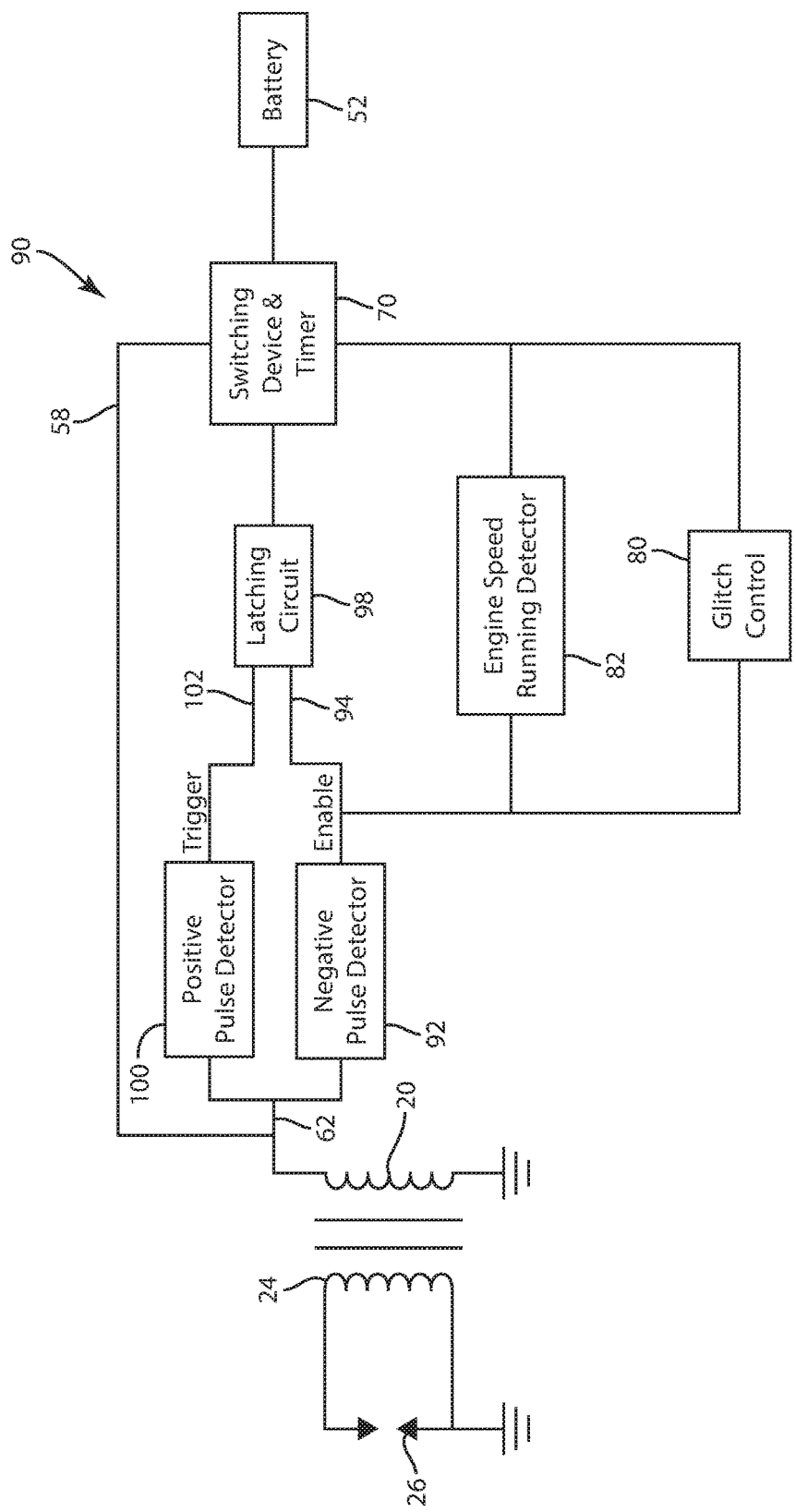
FIG. 8 is a circuit schematic of a third embodiment of an ignition coil boost circuit for an internal combustion engine including a rope pull.

FIG. 8 illustrates a third embodiment of a spark boosting circuit 90 that is used to boost the induced engine pulses created by a rope pull recoil starter and, like FIG. 7, does not require the use of a microcontroller. The spark boosting circuit 90 of FIG. 8 could also be used with a starter motor powered by a battery. Many of the components in FIG. 8 are similar to those shown and described above with reference to FIG. 7 and similar reference numerals are used.

The spark boosting circuit 90 includes both a positive pulse detector 100 and a negative pulse detector 92 that are connected to the line 62 to sense the series of small, induced voltage pulses and peaks created by the rotating flywheel. The negative pulse detector 92 initially senses the negative portion of a voltage pulse induced in the primary winding 20 by the rotating flywheel and present on line 62. Upon detecting this negative portion of the induced pulse, the negative pulse detector 92 generates an enable signal along line 94, which is received by a latching circuit 98. The enable signal on line 94 is the first input to the latching circuit 98. The latching circuit could be one of several types of circuits, such as a digital logic component or a combination of analog components.

The circuit of FIG. 8 further includes a positive pulse detector 100 that detects the start of the second positive pulse, which occurs after the negative portion of the induced pulse. When the positive pulse detector 100 detects this portion of the induced pulse, the detector 100 generates a triggering signal along line 102. The triggering signal along line 102 is supplied to the latching circuit 98. Upon receiving the triggering signal on line 102 after receiving the enable signal on line 94, the latching circuit 98 provides an activation signal to the switching device and timer circuit 70. Upon receipt of this signal, the switching device 70 transitions into the first condition in which the switching device 70 allows the stored energy from the battery 52 to discharge through line 58 to the primary winding 20. As described previously, the discharge of the battery 52 through the switching device 70 and line 58 creates the voltage pulse.

As with the embodiment shown and describe in FIG. 7, the switching device and timer circuit 70 includes an internal timer that control the duration of time the battery 52 is connected to the primary winding 20. When the switching device turns off, the flow of current from the battery to the primary winding 20 is interrupted, which create the spark across spark plug 26.

As with the embodiment shown in FIG. 7, the glitch control circuit 80 and engine speed running detector 82 prevent the supply of current from the battery 52 when the engine speed exceeds the rotational speed threshold and after the generation of a spark by the spark plug 26.

In the embodiment of FIGS. 7 and 8, the positive pulse described as being the trigger and the negative portion of the pulse is the enable. However, if the orientation of the magnets on the flywheel were reversed, the signals of FIGS. 7 and 8 would change from a positive-negative-positive pulse to a negative-positive-negative pulse. The description and circuit diagrams in the present disclosure would then simply be reconfigured to accommodate the modified triggering signals in order to identify and act on the triggering signal at or near the top dead center of the piston movement and timing.

As can be understood by the above disclosure, the circuit 38 of FIG. 5 and the circuits 60 and 90 shown in FIGS. 7 and 8 can be used to supplement the current flow through the primary winding in an internal combustion engine including a rope pull recoil starter or in an internal combustion engine having a partially discharged starter battery. It is contemplated that the battery 52 will need to supply approximately 4 amps for approximately 2 milliseconds. Thus, the capacity of the battery 52 can be relatively small. In each of the circuits, once the engine begins rotating at greater than a selected speed, such as 300 RPMs, the battery spark enhancement is turned off to prevent further discharge of the battery power supply 52. Further, the circuits also operate to prevent the real spark event to keep the early spark from hurting starting since the early spark will burn the combustion air/fuel mixture quickly and push the piston backwards.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for enhancing spark generation in an ignition coil of an internal combustion engine including a flywheel that rotates past a primary winding, the system comprising:
    a controller in communication with the primary winding and operable to determine the rotational speed of the flywheel;
    a electrical storage device;
    a switching device positioned between the electrical storage device and the primary winding, wherein the electrical storage device is connected to the primary winding to provide a voltage pulse to the primary winding when the switching device is in a first condition,
    wherein the controller is operable to transition the switching device between the first condition and a second condition.

2. The system of claim 1 wherein the electrical storage device is a battery.

3. The system of claim 1 further comprising a speed sensing circuit positioned between the primary winding and the controller, wherein the speed sensing circuit determines the rotational speed of the flywheel based upon pulses induced by the flywheel.

4. The system of claim 3 wherein the controller causes the switching device to transition between the first condition and the second condition when the rotational speed is below a threshold rotational speed.

5. The system of claim 4 wherein the controller causes the switching device to be in only the second condition when the rotational speed is above the threshold rotational speed.

6. The system of claim 1 wherein the controller holds the switching device in the first condition for a predetermined pulse period.

7. The system of claim 1 wherein the controller transitions the switching device to the first condition upon detection of a voltage transition in a voltage pulse induced in the primary winding.

8. A system for enhancing spark generation in an ignition coil of an internal combustion engine including a flywheel that rotates past a primary winding, the system comprising:
   an electrical storage device;
   a switching device positioned between the electrical storage device and the primary winding, wherein the electrical storage device is connected to the primary winding to provide a voltage pulse to the primary winding when the switching device is in a first condition,
   wherein the switching device transitions between the first condition and a second condition when the rotational speed of the flywheel is below a threshold rotational speed.

9. The system of claim 8 wherein the electrical storage device is a battery.

10. The system of claim 8 wherein the switching device is only in the second condition when the rotational speed is above the threshold rotational speed.

11. The system of claim 8 wherein the switching device in the first condition for a predetermined pulse period.

12. The system of claim 8 wherein the switching device transitions to the first condition upon detection of a voltage transition in a voltage pulse induced in the primary winding.

13. A method of enhancing spark generation in an ignition coil of an internal combustion engine including a flywheel that rotates past a primary winding, the method comprising the steps of:
   detecting the rotational speed of the flywheel based on a series of induced voltage pulses during a starting procedure;
   comparing the detected rotational speed to a threshold rotational speed; and
   supplying a voltage pulse from an electrical storage device to the primary winding when the detected rotational speed is below the threshold rotational speed.

14. The method of claim 13 wherein the electrical storage device is a battery.

15. The method of claim 13 further comprising the steps of:
   detecting a voltage transition of the induced voltage pulse; and
   supplying the voltage pulse from the electrical storage device at a time based on the detected voltage transition.

16. The method of claim 15 wherein the voltage pulse is provided for a pulse period.

17. The method of claim 15 wherein the voltage pulse is delayed from the detected voltage transition.

18. The method of claim 15 wherein the voltage transition is related to a top dead center position of the internal combustion engine.

* * * * *